US012693151B1

(12) United States Patent
Schiller

(10) Patent No.: US 12,693,151 B1
(45) Date of Patent: Jul. 28, 2026

(54) ELECTRODE WEIGHING APPARATUS AND METHOD

(71) Applicant: Mazzella Lifting Technologies, Inc., Cleveland, OH (US)

(72) Inventor: Tom D. Schiller, Nashville, TN (US)

(73) Assignee: Mazzella Lifting Technologies, Inc., Cleveland, OH (US)

( * ) Notice: Subject to any disclaimer, the term of this patent is extended or adjusted under 35 U.S.C. 154(b) by 425 days.

(21) Appl. No.: 18/198,042

(22) Filed: May 16, 2023

Related U.S. Application Data

(60) Provisional application No. 63/342,461, filed on May 16, 2022.

(51) Int. Cl.
| | |
|---|---|
| *G01G 21/22* | (2006.01) |
| *G01G 3/14* | (2006.01) |
| *G01G 23/02* | (2006.01) |

(52) U.S. Cl.
CPC .............. G01G 21/22 (2013.01); G01G 3/14 (2013.01); G01G 23/02 (2013.01)

(58) Field of Classification Search
CPC ........... G01G 21/22; G01G 3/14; G01G 23/02
See application file for complete search history.

(56) References Cited

U.S. PATENT DOCUMENTS

| | | | |
|---|---|---|---|
| 1,702,359 | A | 2/1929 | Molmark |
| 2,226,652 | A | 12/1940 | York |
| 2,494,775 | A | 1/1950 | Moore |
| 2,899,477 | A | 8/1959 | Cartoux |
| 3,198,870 | A | 8/1965 | Simpkin |
| 3,249,673 | A | 5/1966 | Moore |
| 3,517,954 | A | 6/1970 | Snyder |
| 3,600,031 | A | 8/1971 | Coleman |
| 3,626,573 | A | 12/1971 | Blake |
| 3,752,896 | A | 8/1973 | Zimmerman |
| 3,781,449 | A | 12/1973 | Wolf |
| 3,790,204 | A | 2/1974 | Lighthipe, Jr. |
| 3,796,818 | A | 3/1974 | Yuasa |
| 3,814,828 | A | 6/1974 | Gazda |
| 4,044,199 | A | 8/1977 | Simon |
| 4,154,974 | A | 5/1979 | Wynne |
| 4,162,368 | A | 7/1979 | Brazier |
| 4,167,643 | A | 9/1979 | Charnock |
| 4,185,158 | A | 1/1980 | Koga |
| 4,317,951 | A | 3/1982 | Boudeau |
| 4,323,717 | A | 4/1982 | Garner |
| 4,349,910 | A | 9/1982 | Belz |

(Continued)

FOREIGN PATENT DOCUMENTS

| | | |
|---|---|---|
| GB | 143292 | 5/1920 |
| IT | 1052996 | 8/1981 |

(Continued)

*Primary Examiner* — John E Breene
(74) *Attorney, Agent, or Firm* — Holland & Knight LLP; Matthew C. Cox; Forrest S. Tinnin

(57) ABSTRACT

An apparatus for weighing an electrode is provided. The apparatus may include a platform, an electrode holder, and one or more load cells. The electrode holder may include a frame having an axial passage shaped to receive the electrode. The load cells may be positioned between the electrode holder and the platform. When the electrode is received within the axial passage, the load cells may measure a weight of the electrode.

8 Claims, 6 Drawing Sheets

(56) References Cited

U.S. PATENT DOCUMENTS

| | | | |
|---|---|---|---|
| 4,400,815 A | | 8/1983 | Dunn |
| 4,420,838 A | | 12/1983 | Dunn |
| 4,665,530 A | | 5/1987 | Corbethau |
| 4,703,492 A | | 10/1987 | Sekiguchi |
| 4,736,384 A | | 4/1988 | Sakai |
| 4,815,847 A | * | 3/1989 | Oberheim .......... G01N 21/3103 |
| | | | 356/315 |
| 4,909,338 A | * | 3/1990 | Vitunic .................. G01G 23/01 |
| | | | 73/1.13 |
| 5,161,845 A | | 11/1992 | Carpenter, Jr. |
| 5,208,442 A | | 5/1993 | Ahola |
| 5,255,285 A | | 10/1993 | Alberi |
| 5,638,398 A | | 6/1997 | Ikitsu |
| 5,757,841 A | | 5/1998 | Ikitsu |
| 5,870,424 A | | 2/1999 | Todoriki |
| 6,084,200 A | | 7/2000 | Ahola |
| 6,115,405 A | * | 9/2000 | Brunner ................. H05B 7/109 |
| | | | 373/105 |
| 6,167,076 A | | 12/2000 | Ignacio |
| 6,243,408 B1 | * | 6/2001 | Knudsen ............... H05B 7/102 |
| | | | 373/52 |
| 6,265,690 B1 | | 7/2001 | Fornsel |
| 7,547,861 B2 | | 6/2009 | Jorgensen |
| 7,660,337 B2 | | 2/2010 | Teeples |
| 7,992,634 B2 | | 8/2011 | Angelle |
| 8,790,569 B2 | | 7/2014 | Reali |
| 9,383,278 B1 | | 7/2016 | Schiller |
| 9,630,811 B2 | | 4/2017 | Smith |
| 9,841,334 B1 | | 12/2017 | Schiller |
| 9,844,104 B1 | | 12/2017 | Schiller |
| 9,850,105 B1 | | 12/2017 | Schiller |
| 9,930,733 B1 | | 3/2018 | Schiller |
| 10,028,338 B1 | | 7/2018 | Schiller |
| 10,077,169 B1 | | 9/2018 | Schiller |
| 2008/0084907 A1 | | 4/2008 | Lehr |
| 2010/0272146 A1 | | 10/2010 | Piccardi |
| 2011/0274137 A9 | | 11/2011 | Piccardi |
| 2014/0326787 A1 | * | 11/2014 | Barten .................. G01G 21/30 |
| | | | 235/383 |

FOREIGN PATENT DOCUMENTS

| | | | | |
|---|---|---|---|---|
| IT | 1192885 | | 5/1988 | |
| IT | 1297835 | | 8/1998 | |
| JP | 11268881 | | 10/1999 | |
| JP | 2000306662 | * | 11/2000 | ............. Y02P 10/25 |
| JP | 3388329 | | 3/2003 | |

* cited by examiner

Weight: 132.64 lbs
Usable Life: 2.1 hours
Available electrodes to join:
B233G5F, B965H7W, ...

ELECTRODE WEIGHING APPARATUS AND METHOD

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a non-provisional of, and claims benefit and priority to, Provisional U.S. Patent Application No. 63/342,461 filed May 16, 2022, which is hereby incorporated by reference in its entirety.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates generally to machinery for manipulating electrodes.

More particularly, the present disclosure relates to devices and methods for gathering information on electrodes used in metal arc furnaces. Metal arc furnaces heat charged material within a large vessel by means of an electric arc. Passing an electric current through one or more electrodes creates a high-voltage arc, generating a large amount of heat. Such heat generated may be used for melting metal, particularly for making steel. Graphite electrodes are commonly used in this process due to graphite's natural properties which make it an excellent conductor.

The graphite electrodes used in metal arc furnaces are often large and may weigh several tons. During use, an electrode column is consumed within the vessel of the furnace, eventually reaching a length at which it cannot be used independently. A partially-consumed electrode may be joined with another partially-consumed or unused electrode in an end-to-end configuration using a threaded joint such that the joined electrode is of adequate length to be used in a metal arc furnace. However, users generally cannot obtain useful information on the spent electrodes before or after they are consumed to an unusable length. For example, a user of an arc furnace may not be able to determine how many heats remain in a partially-consumed electrode. Additionally, users may desire to know the electrode consumption and cost per ton of steel and how many pounds of electrode material went into a specific output of steel. However, conventional devices do not provide such data.

This lack of data creates challenges in planning for adequate electrode supplies to meet demand for output of metal arc furnaces. It may also lead to costly inefficiencies in furnace operations.

What is needed then are improvements to the systems and methods used to gather information on electrodes used in metal arc furnaces.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is an apparatus for weighing an electrode securable to a mounting platform having a platform hole shaped to receive the electrode. The apparatus includes an electrode holder, which includes a latch, configured to receive and retain the electrode within the electrode holder. The apparatus further includes an electrode weighing assembly having at least one load cell and positionable between the electrode holder and the mounting platform. The apparatus is operable such that when the electrode is retained in the electrode holder and the electrode weighing assembly is positioned between the electrode holder and the mounting platform, the electrode weighing assembly is operable to measure the weight of the electrode. The apparatus may further include additional elements that secure the electrode in place and transmit the weight measurement from the electrode weighing assembly to electronic data storage and display.

Another aspect of the disclosure is a method for weighing an electrode including providing a mounting platform, providing an electrode weighing assembly having at least one load cell, placing an electrode holder including a clamping assembly operable to retain the electrode above the electrode weighing assembly, retaining an electrode within the electrode holder, and weighing the electrode with the electrode weighing assembly. The method may further comprise additional steps.

One objective of the present disclosure is to provide a system and method for weighing an electrode that may be used in a metal arc furnace such that a user may track electrode consumption. The electrode can be weighed before and after it is used in the furnace to determine the difference in its weight, and thus calculate the weight of the electrode that was consumed during use. A user may compare electrode consumption with other information, such as the output of the furnace, the number of times an electrode was used, and the length of time the electrode was used. These data points may be analyzed to improve the efficiency of electrode consumption in a metal arc furnace. Additionally, a partially-consumed electrode may be joined with another partially-consumed electrode or an unused electrode.

Another objective of the present disclosure is to allow a user to weigh multiple electrodes to be joined and determine the overall weight of the joined electrodes. With this information, a user may be able to determine the most efficient way to join two or more partially-consumed electrodes.

Numerous other objects, advantages and features of the present disclosure will be readily apparent to those of skill in the art upon a review of the following drawings and description of a preferred embodiment.

DETAILED DESCRIPTION

Figure 1:
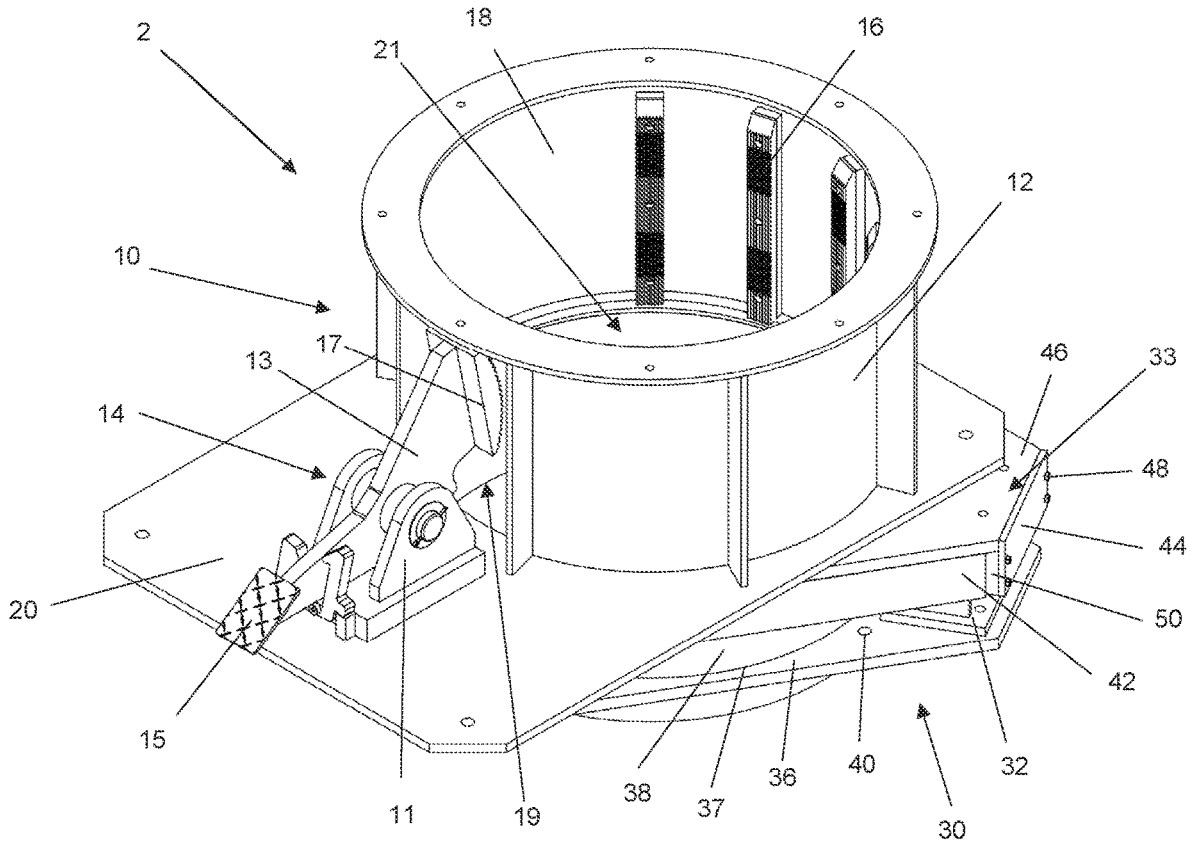
FIG. 1 is a perspective view of one embodiment of an apparatus of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

The apparatus and method disclosed herein allow handlers of electrodes that may be used in a metal arc furnace to weigh electrodes. Referring now to FIGS. 1-3, an apparatus 2 for weighing an electrode 6 (depicted with particular reference to FIG. 2B) is shown, according to some embodiments of the present disclosure. As discussed in greater detail below, a user may use the apparatus 2 in order to determine the weight of the electrode 6. Moreover, the user may use the apparatus 2 in order to periodically determine the weight of the electrode 6, thus compiling aggregate weight data over time. Such aggregated weight data may be interpreted (e.g., by comparing relative points of the aggregated weight data) in order to facilitate a number of advantageous determinations. As examples, the aggregated weight data may be used to calculate the remaining usable life of an electrode 6, evaluate the efficiency of a metal arc furnace, and calculate the total weight of an electrode column created by joining together two or more electrodes.

In some embodiments, the apparatus 2 includes an electrode holder 10 and an electrode weighing assembly 30. The electrode holder 10 may be configured to receive and retain the electrode 6, while the electrode weighting assembly may be configured to measure a weight of the electrode 6. For example, and as depicted with particular reference to FIG. 2B, the apparatus 2 may further include a platform (e.g., a mounting platform) 4 on which the electrode weighing assembly 30 is disposed. The platform 4 may be retained in a static position. The electrode holder 10, in turn, may be disposed on the electrode weighting assembly 30. Therefore, the electrode holder 10 may be positioned above the platform 4.

As depicted with particular reference to FIG. 2B, the electrode 6 may be vertically received within the apparatus 2 in order for the electrode weighing assembly 30 to measure the weight of the electrode 6. Accordingly, and as discussed in greater detail below, one, some, or all of the electrode holder 10, the electrode weighing assembly 30, and the platform 4 may be shaped to vertically receive the electrode 6 in order to provide the apparatus and methods discussed herein.

In some embodiments, the electrode weighing assembly 30 includes one or more load cells 32. As shown with reference to FIG. 2B, the load cell(s) 32 may be positioned (vertically, for instance) between the electrode holder 10 and the platform 4. The electrode holder 10 may be configured to receive and retain the electrode 6, such that the weight of the electrode 6 is imparted on the load cell(s) 32 of the electrode weighing assembly 30. As discussed in greater detail below with reference to FIGS. 4-5, when the weight of the electrode 6 is imparted on the load cell(s) 32, the load cell(s) 32 may measure (e.g., determine, calculate, etc.) a weight of the electrode 6.

As mentioned above, the electrode holder 10 may be shaped to vertically receive the electrode 6 in order to provide the apparatus and methods discussed herein. For example, the electrode holder apparatus 10 may include a first frame 12 having a first axial passage 21 shaped to vertically receive the electrode 6. For instance, the first frame 12 may be cylindrical. As mentioned above, the electrode holder 10 may be configured to retain the electrode 6. For example, the electrode holder apparatus 10 may be configured to secure the electrode 6 within the first axial passage 21, such that the electrode holder 10 retains the electrode 6. Accordingly, in some embodiments, the apparatus 2 includes the platform 4, the electrode holder 10, and the load cell(s) 32. The electrode holder 10 may include the first frame 12, which may include the first axial passage 21 shaped to receive the electrode 6. When the electrode 6 is received within he first axial passage 21, the load cell(s) 32 may measure the weight of the electrode 6.

In some embodiments, the electrode holder 10 further includes a footplate 20 and a latch 14, which may be configured to secure the electrode 6 within the first axial passage 21. For example, the footplate 20 may extend outward from a bottom portion of the first frame 12, and the latch 14 may be disposed on the footplate 20. In turn, the latch 14 may be configured to be engaged or disengaged, such that the latch 14 grasps or frees the electrode 6, thereby securing the electrode 6 within, or releasing the electrode 6 from, the first axial passage 21 of the first frame 12. As suggested above, when the electrode 6 is secured within the axial passage 21, the weight of the electrode 6 may be imparted on the load cell(s) 32 of the electrode weighing assembly 30, such that the load cell(s) 32 are able to measure the weight of the electrode 6.

In some embodiments, the latch 14 of the electrode holder 10 includes a base 11 disposed on the footplate 20, an arm 13 pivotally coupled to the base 11, a foot petal 15 disposed on one end of the arm 13, and a grip 17 disposed on the other end of the arm 13. The latch 14 may be engaged or disengaged to pivot the arm 13 about the base 11, thereby translating a position of the grip 17. When the arm 13 is pivoted about the base 11, the grip 17 may be translated towards the electrode 6 or away from the electrode 6. When the grip 17 is translated towards the electrode 6, the grip 17 may mechanically engage (e.g., grasp, contact, push, etc.) the electrode 6. When the grip 17 is translated away from the electrode 6, the grip 17 may free (e.g., unfetter, let go of, etc.) the electrode 6. Accordingly, the grip 17 may be translated in order to grasp or free the electrode 6, such that the electrode 6 may be secured within, or released from, the first axial passage 21 of the cylindrical frame 12.

In some embodiments, the grip 17 is translated through the first frame 12 in order to grasp the electrode 6. For example, the first frame 12 may include a window 19, through which the grip 17 may be translated. In this sense, when the arm 13 is pivoted about the base 11, the grip 17 may be translated into the window 19 (and towards the electrode 6) or out of the window 19 (and away from the electrode 6). In other embodiments, the first frame 12 is not translated through the first frame 12 in order to grasp the electrode 6. For example, the latch 14 may be positioned relative to the first frame 12 (above the first frame 12, for example), in order to grasp the electrode 6 without a need to be translated through the first frame 12. In such cases, the first frame 12 may not include the window 19.

As mentioned above, when the latch 14 is engaged such that the grip 17 grasps the electrode 6, the electrode 6 may be secured within the first axial passage 21 of the first frame 12. In some embodiments, when the grip 17 grasps the electrode 6, the electrode 6 is retained against an inner surface 18 of the first frame 12. For example, when the grip 17 grasps the electrode 6, the electrode 6 may be biased away from the grip 17 and towards at least a portion of the inner surface 18. In turn, the electrode 6 may be retained against the portion of the inner surface 18. Accordingly, in some embodiments, the electrode holder 10 includes the latch 14, which may be configured to mechanically engage the electrode 6, such that the electrode 6 is biased against the inner surface 18 of the first axial passage 21 and secured within the first axial passage 21. The latch 14 may include the arm 13, which may be disposed on the base 11, and the latch 14 may mechanically engage the electrode 6 by pivoting the arm 13 relative to the base 11.

In some embodiments, the first frame 12 further includes a number of teeth 16 disposed on the inner surface 18. The teeth 16 may each feature a coarse or tactile surface, such that when the electrode 6 is biased against the teeth 16, the electrode 6 is secured in place. In such embodiments, when the grip 17 grasps the electrode 6, the electrode 6 may be biased against the teeth 16, such that the electrode 6 is secured in place and therefore secured within the first axial passage 21 of the first frame 12. In some arrangements, the teeth 16 are spaced along the entire curvature of the inner surface 18 (aside from the window 19, if implemented). In other arrangements, the teeth 16 are spaced along a portion of the curvature of the inner surface 18. For example, the teeth 16 may be spaced along a portion of the inner surface 18 that is generally opposite the grip 17, thereby corresponding to a region of the inner surface 18 that the electrode 16 may be biased towards when the electrode 6 is grasped by the grip 17. As depicted with particular reference to FIG. 3, the first frame 12 includes four teeth 16. In other embodiments, the first frame 12 includes less teeth 16 (e.g., one, two, three), or more teeth 16 (e.g., five, six, seven, and so on).

As mentioned above, the latch 14 may be operated to mechanically engage the electrode 6, thereby securing the electrode 6 within the first axial passage 21 of the first frame 12. For example, and as depicted with particular reference to FIG. 2B, after inserting the electrode 6 within the first axial passage 21, a user may engage the latch 14 in order to secure the electrode 6 within the first axial passage 21 by lifting the foot pedal 15. When the foot petal 15 is lifted, the arm 13 may be pivoted about the base 11 such that the grip 17 is translated towards the electrode 6, thereby mechanically engaging the electrode 6 with the grip 17 and thus securing the electrode 6 within the first axial passage 21. In other embodiments, a user may engage the latch 14 (in order to secure the electrode 6 within the axial passage 21) by lowering the foot pedal 15.

Figure 2A:
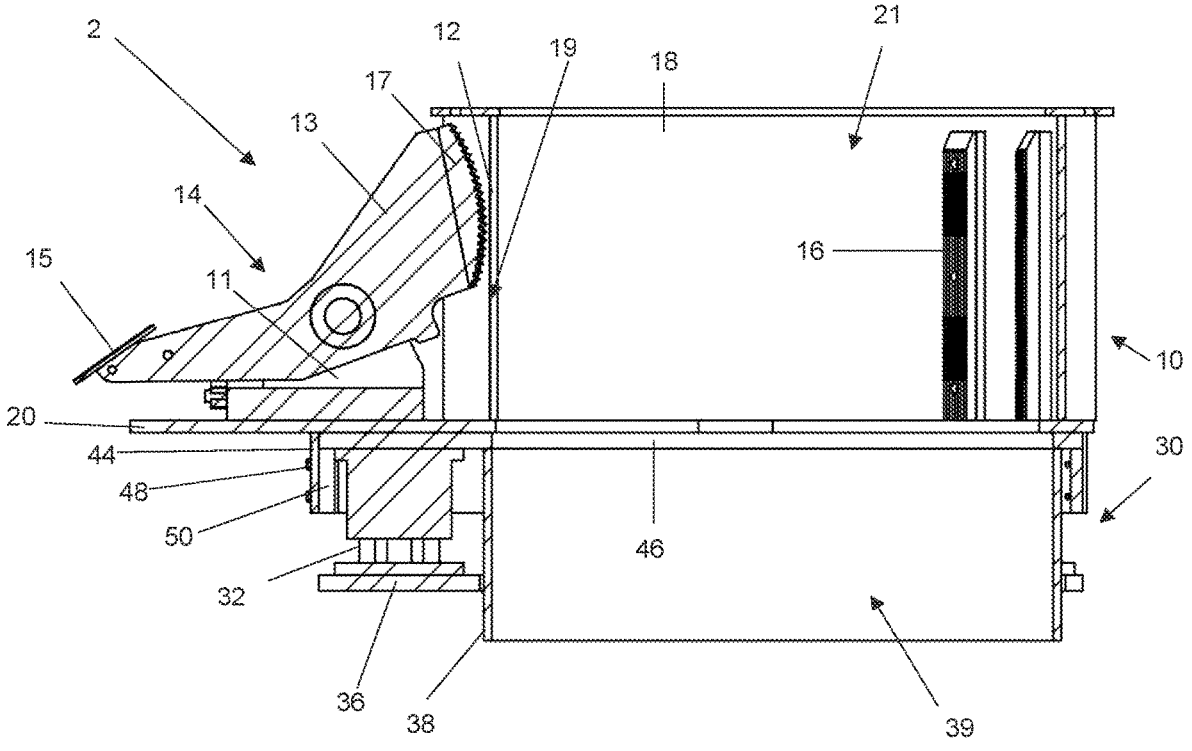
FIG. 2A is a cross-section view of the apparatus of FIG. 1 in a resting position.
Figure 2B:
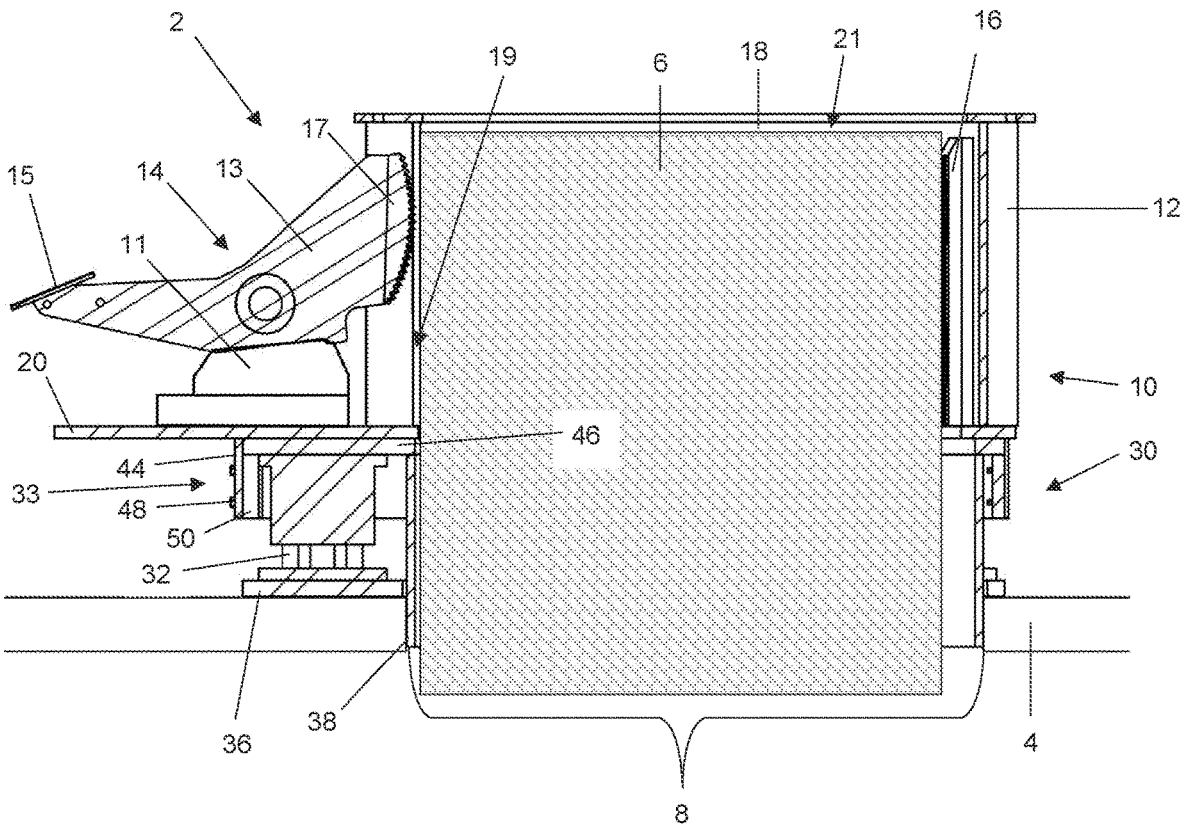
FIG. 2B is a cross-section view of the apparatus of FIG. 1 engaged with an electrode and attached to a mounting platform.
Figure 3:
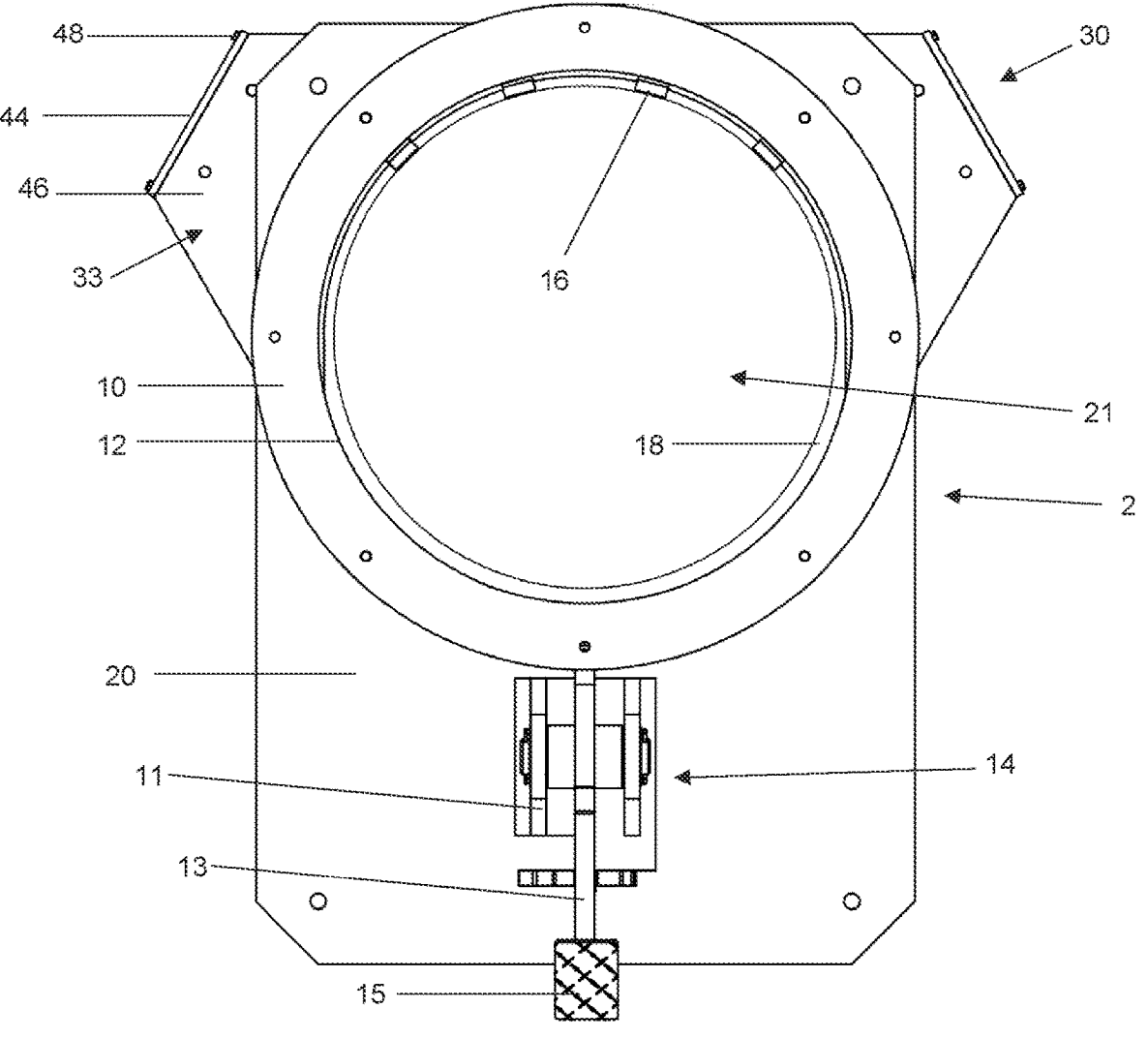
FIG. 3 is a top-perspective view of the apparatus of FIG. 1.

As a second example, and as depicted with particular reference to FIG. 2A, the user may disengage the latch 14 in order to release the electrode 6 from the first axial passage 21 by lowering the foot pedal 15 (e.g., pressing the foot pedal 15 down), thereby freeing the electrode 6 from the grip 17 and thus releasing the electrode 6 such that the electrode 6 is removable from the apparatus 2. In other embodiments, a user may disengage the latch 14 by lifting the foot pedal 15.

In some embodiments, a user may insert the electrode 6 within the first axial passage 21 of the first frame 12 by controlling certain machinery that directly handles the electrode 6. Once the electrode 6 is inserted within the first axial passage 21, the user may engage the latch 14 in order to secure the electrode 6 within the first axial passage 21. Thus, the electrode holder 10 may be operated without physical contact between a user and the electrode 6.

Figure 4:
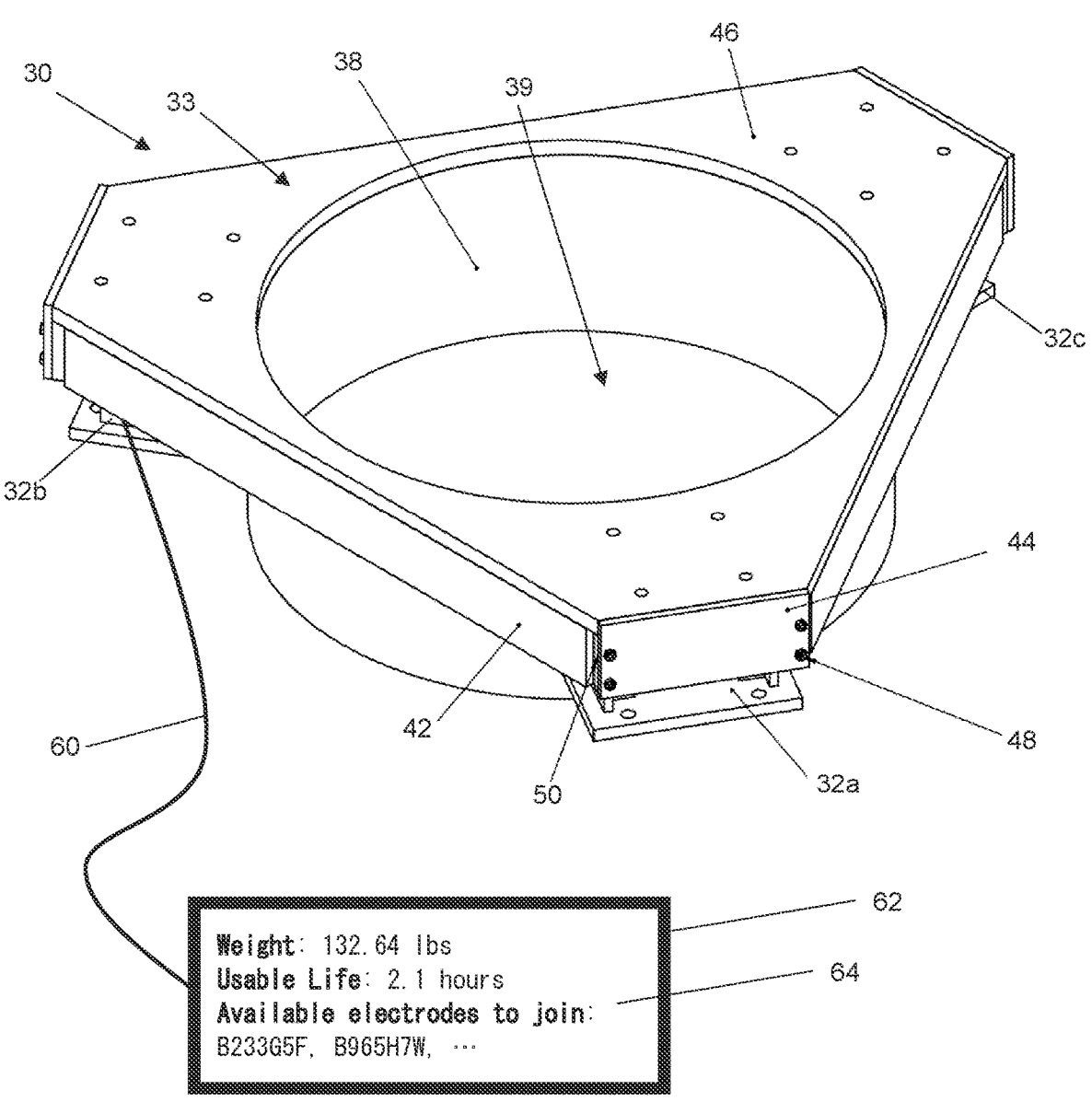
FIG. 4 is a perspective view of one embodiment of an electrode weighing assembly of the present disclosure.
Figure 5:
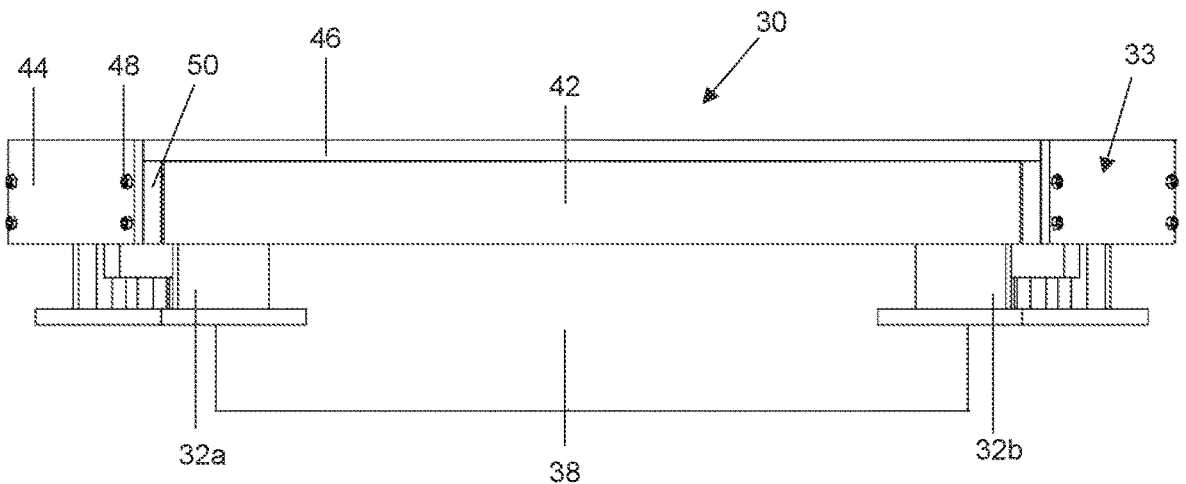
FIG. 5 is a side view of the electrode weighing assembly of FIG. 4.

Referring now to FIGS. 4 and 5, the electrode weighing assembly 30 is shown in greater detail, according to some embodiments of the present disclosure. As mentioned above, the electrode weighing assembly 30 may include the load cell(s) 32, which may be configured to measure the weight of the electrode 6. In some embodiments, the load cell(s) 32 include a single load cell. In other embodiments, and as depicted with particular reference to FIG. 4, the load cell(s) 32 include three load cells: a first load cell 32a, a second load cell 32b, and a third load cell 32c. In other embodiments still, the load cell(s) 32 include two load cells. In even other embodiments, the load cell(s) 32 include four or more load cells. It should be appreciated that, while the electrode weighing assembly 30 as depicted with reference to FIGS. 1-5 generally appears configured such that the load cell(s) 32 include three load cells, such depictions are exemplary and non-limiting in nature, and a quantity of the load cell(s) 32 implemented in the electrode weighing assembly 30 may be varied in order to provide the apparatuses and methods provided for herein. For example, the quantity of the load cell(s) 32 may be varied depending on the dimensions of the electrode 6, the expected mass of the electrode 6, dimensions of the apparatus 2 (as afforded or limited by the surrounding environment of the apparatus 2, for instance), and other applicable concerns.

As mentioned above, the electrode holder 10 may be configured to receive and retain the electrode 6, thereby allowing the weight of the electrode 6 to be imparted on the load cell(s) 32, such that the load cell(s) 32 are able to measure the weight of the electrode 6. In some embodiments, the load cell(s) 32 are compression load cells, and therefore measure a compressive deflection in the load cell(s) 32 when the weight of the electrode 6 is imparted on the load cell(s) 32. For example, as discussed in greater detail below, the electrode holder 10 may be secured to an upper surface of the load cell(s) 32, and a lower surface of the load cell(s) 32, in turn, may be secured to the platform 4. The electrode holder 10 may be free to move upwards or downwards, while the platform 4 is retained in a static position. Accordingly, when the electrode 6 is secured within the first axial passage 21 of the first frame 12 and the weight of the electrode 6 is imparted on the load cell(s) 32, the upper surface of the load cell(s) 32 may be deflected (e.g., biased downward) relative to the lower surface of the load cell(s) 32. The load cell(s) 32 may detect such compressive deflection and, based on the compressive deflection, measure the weight of the electrode 6. Thus, the load cell(s) 32 may be compression load cells, such that when the electrode 6 is received within the first axial passage 21, the load cell(s) are compressed between the electrode holder 10 and the platform 4.

As mentioned above, the platform 4 may be shaped to vertically receive the electrode 6 in order to provide the apparatus and methods discussed herein. For example, and as depicted with reference to FIG. 2B, the platform 4 may include a platform hole 8, and the electrode 6 may vertically extend through the platform hole 8. In this sense, the platform hole 8 may facilitate the electrode holder 10 retaining, along a vertical length of the electrode 6, a generally upper or medial portion of the electrode 6 such that the electrode 6 extends downward and through the platform 4. In other embodiments, the electrode holder 10 may retain a lower portion of the electrode 6, such that the electrode 6 does not need to extend downward and through the platform 4. Accordingly, in such embodiments, the platform 4 may not include the platform hole 8. When implemented in the apparatus 2, the platform hole 8 may be aligned with the first axial passage 21 of the first frame 12 in the electrode holder 10.

In some embodiments, the electrode weighing assembly 30 includes a housing 33, to which the load cell(s) 32 may be attached. Accordingly, the apparatus 2 may include the housing 33, which may be positioned between the platform 4 and the electrode holder 10, and the load cell(s) 32 may be disposed on the housing 33. The housing 33 may facilitate imparting the weight of the electrode 6 on the load cell(s) 32, thereby facilitating compressive deflection in the load cell(s) 32 in response to the weight of the electrode 6. As a first example, the housing 33 may include a top plate 46. The top plate 46 may be configured to secure the upper surface of the load cells to the electrode holder 10. For instance, and as depicted with reference to FIG. 2B, the top plate 46 may be disposed on the upper surface of the load cell(s) 32, as well as a lower surface of the foot plate 20 of the electrode holder 10. In other words, the top plate 46 may be positioned between load cell(s) 32 and the electrode holder 10. Accordingly, the top plate 46 of the housing 33 may secure the upper surface of the load cell(s) 32 to the electrode holder 10, and thereby facilitate imparting the weight of the electrode 6 on the load cell(s) 32. In some embodiments, the footplate 20 of the electrode holder 10 includes one or more holes for securing the electrode holder 10 to the top plate 46 (via mechanical fasteners, for example).

As a second example, the housing 33 may include a mounting plate 36. The mounting plate 36 may be configured to secure the lower surface of the load cell(s) 32 to the platform 4. For instance, and as depicted with reference to FIGS. 1-2B, the mounting plate 36 may be disposed on a lower surface of the load cell(s) 32, as well as an upper surface of the platform 4. In other words, the mounting plate 36 may be positioned between the load cell(s) 32 and the platform 4. Accordingly, the mounting plate 36 may facilitate retaining the lower surface of the load cell(s) 32 in place. Accordingly, when the electrode 6 is secured within the first axial passage 21 of the first frame 12, thus imparting the weight of the electrode 6 on the load cell(s) 32, the lower surface of the load cell(s) 32 maybe retained in place, and thus the load cell(s) 32 may be compressed in order to measure the weight of the electrode 6. In some embodiments, the mounting plate 36 includes one or more holes for attaching the mounting plate 36 to the platform 4 (via mechanical fasteners, for example).

In some embodiments, the load cell(s) 32 are directly attached to the electrode holder 10 (e.g., the load cells are disposed on the foot plate 20 and/or first frame 12). In such embodiments, the housing 33 may not include the top plate 46. Similarly, the load cell(s) 32 may be directly attached to or disposed on the platform 4. In such embodiments, the housing 33 may not include the mounting plate 36. Accordingly, in some embodiments where the load cell(s) 32 are directly attached to the electrode holder 10 and the platform 4, the electrode weighing assembly 30 does not include the housing 33.

As discussed above, the electrode holder 10 may be disposed on the top plate 46, which is disposed on the load cell(s) 32, or the electrode holder 10 may be directly disposed on the load cell(s) 32. In any case, when the electrode 6 is secured within the first axial passage 21 of the first frame 12 in the electrode holder 10, the weight of the electrode 6 may be imparted on the load cell(s) 32. In such embodiments where the load cell(s) 32 includes two or more load cells, the load cell(s) 32 may be positioned such that the load cell(s) 32 are equidistant relative to the electrode 6 when the electrode 6 is secured within the first axial passage 21. Moreover, the load cell(s) 32 may be evenly spaced about a circumference defined around the electrode 6. In this sense, an equal distribution of weight may be imparted to the load cell(s) 32. Thus, the load cell(s) 32 may provide an accurate weight reading for the electrode 6.

As mentioned above, the electrode weighing assembly 30 may be shaped to vertically receive the electrode 6 in order to provide the apparatus and methods discussed herein. For example, the electrode weighing assembly 30 may include a second frame 38, which may be attached to the housing 33, or formed as a single component with the housing 33. The second frame 38 may include a second axial passage 39 shaped to vertically receive the electrode 6. Similarly, and as depicted with reference to FIG. 1, the mounting plate 36 may include a mounting plate hole 37 shaped to vertically receive the electrode 6. In some embodiments where the electrode weighing assembly 30 includes the second frame 38, the mounting plate hole 37 may be shaped to receive the second frame 38. When implemented in the apparatus 2, the second axial passage 39 and/or the mounting plate hole 37 may be aligned with the first axial passage 21 of the first frame 12 in the electrode holder 10. In such embodiments where the load cell(s) 32 includes two or more load cells, the load cell(s) 32 may be positioned such that the load cell(s) 32 are equidistant relative to, and evenly spaced about, the second frame 38.

In some embodiments, and as depicted with reference to FIG. 2B, the second frame 38 is attached to the top plate 46 and extends downward from the top plate 46. Depending on the implementation, the second frame 38 may extend downward through the mounting plate hole 37 of the mounting plate 36 and/or the platform hole 8 of the platform 4. In such cases, the second frame 38 may be attached to the mounting plate 36 and/or the platform 4. The second frame 38 may prevent the electrode 6 from scratches or other damage that may be caused as the electrode 6 is lowered into electrode holder 10, particularly as it passes through the first axial passage 21, the second axial passage 39, and/or the platform hole 8.

As depicted with particular reference to FIG. 4, the housing 33 of the electrode weighing assembly 30 may form a triangular shape. Such a triangular shape may be advantageous for housing the first, second, and third load cell(s) 32*a*, 32*b*, 32*c* (e.g., where the load cell(s) 32 include three load cells). However, in other embodiments, the housing 33 may form other shapes, such as circular, square, rectangular, and so on. Accordingly, depending on the implementation (e.g., the number of load cells included in the load cell(s) 32), the housing 33 may be shaped or dimensioned as appropriate to facilitate an equal distribution of weight being imparted on the load cell(s) 32 as discussed above.

In some embodiments, the housing 33 of the electrode weighing assembly 30 further includes one or more side plates 42 and one or more end caps 44. The number of each of the side plates 42 and the end caps 44 may correspond to the shape of the housing 33. As depicted with reference to FIG. 2B, the side plates 42 and/or the end caps 44 may be attached to the sides of the top plate 46 to provide additional stability for the electrode weighing assembly 30. In some embodiments, the housing 33 further includes one or more end mounting blocks 50. For example, the end mounting blocks 50 may be attachable to the bottom of the top plate 46 and the ends of the side plates 42. In some embodiments, each of the end caps 44 are secured to a corresponding end mounting block 50 by a number of bolts 48, thereby providing additional stability for the electrode weighing assembly 30 and protection for the end mounting blocks 50, as well as the load cell(s) 32.

Accordingly, as provided herein, a user may position or insert the electrode 6 such that the electrode 6 is received by the electrode holder 10 and engage the clamping assembly 14 such that the electrode holder 10 retains the electrode 6. In turn, the weight of the electrode 6 may be imparted on the load cell(s) 32, such that the load cell(s) 32 may measure the weight of the electrode 6.

In some embodiments, each of the load cell(s) 32 are connected via an electrical connection 60 to a computer 62 having a display screen 64. When the apparatus 2 is used to weigh the electrode 6 as provided herein, the measurement of weight provided by the load cell(s) 32 may be transmitted as a weight reading via the electrical connection 60 to the computer 62 and displayed on the display screen 64, thus enabling a user to read the weight of the electrode 6. Users may save weight readings from multiple electrodes on the computer and this data may be aggregated over time. Such aggregated data may be compared with other data points to calculate the remaining usable life of an electrode 6, evaluate the efficiency of a metal arc furnace, and calculate the total weight of an electrode column created by joining together two or more electrodes.

Accordingly, the present disclosure provides a method of determining the weight of the electrode 6. In some embodiments, the method includes providing the platform 4, providing the electrode holder 10, and providing the load cell(s) 32 such that the load cell(s) 32 are positioned between the electrode holder 10 and the platform 4. The electrode holder 10 may include the first frame 12, which may include the first axial passage 21. Thus, the method may further include inserting the electrode 6 within the first axial passage 21.

In some embodiments, the method further includes engaging the latch 14 on the electrode holder 10, such that the latch 14 mechanically engages the electrode 6, the electrode 6 is biased against the inner surface 18 of the first axial passage 21, and the electrode 6 is secured within the first axial passage 21. The method may further include measuring, via the load cell(s) 32, the weight of the electrode 6, and communicating the measured weight to the user. The method may further include disengaging the latch 14, such that the electrode 6 is released from the first axial passage 21.

Thus, although there have been described particular embodiments of the present invention of a new and useful ELECTRODE WEIGHING APPARATUS AND METHOD, it is not intended that such references be construed as limitations upon the scope of this invention.

What is claimed is:

1. An apparatus for weighing an electrode, comprising:
   a platform;
   an electrode holder including a first frame having a first axial passage shaped to receive the electrode;
   a housing positioned between the platform and the electrode holder;
   a second frame including a second axial passage aligned with the first axial passage; and
   a first load cell, a second load cell, and a third load cell each positioned on the housing between the electrode holder and the platform,
   wherein when the electrode is received within the first axial passage, the first second and third load cells measure a weight of the electrode.

2. The apparatus of claim 1, wherein the electrode holder further includes a latch configured to mechanically engage the electrode, such that the electrode is biased against an inner surface of the first axial passage and secured within the first axial passage.

3. The apparatus of claim 2, wherein the latch includes an arm disposed on a base, and
   wherein the latch mechanically engages the electrode by pivoting the arm relative to the base.

4. The apparatus of claim 1, wherein the electrode holder is positioned above the platform.

5. The apparatus of claim 4, wherein the first load cell is a compression load cell, such that when the electrode is received within the first axial passage, the first load cell is compressed between the electrode holder and the platform.

6. The apparatus of claim 3, wherein the electrode holder is positioned above the platform.

7. The apparatus of claim 6, wherein the first, second, and third load cells are each compression load cells, such that when the electrode is received within the first axial passage, the first, second, and third load cells are each compressed between the electrode holder and the platform.

8. A method of determining a weight of an electrode, comprising:
   providing a platform;
   providing an electrode holder positioned above the platform, the electrode holder including a first frame having a first axial passage;
   providing a second frame having a second axial passage aligned with the first axial passage;
   providing a first load cell positioned between the electrode holder and the platform;
   inserting an electrode within the first axial passage and the second axial passage;
   engaging a latch on the electrode holder such that the latch mechanically engages the electrode, the electrode is biased against an inner surface of the first axial passage, and the electrode is secured within the first axial passage;
   measuring, via the first load cell, the weight of the electrode;
   communicating the measured weight of the electrode to a user; and
   disengaging the latch such that the electrode is released from the first axial passage.

* * * * *